Sept. 28, 1954 — N. MILLER — 2,690,346
DEVICE FOR SECURING BEARING PARTS TO SHAFTS
Filed Jan. 16, 1950 — 3 Sheets-Sheet 1
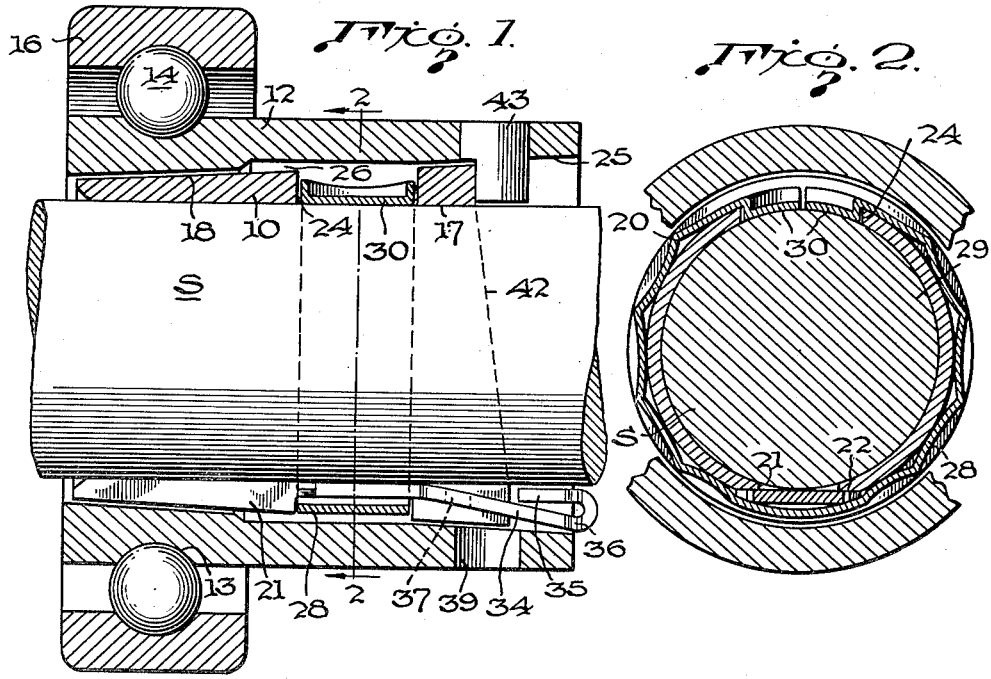
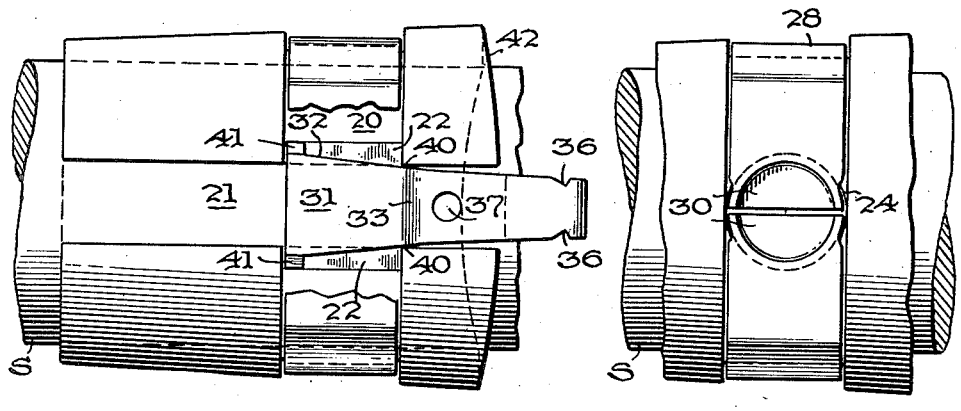
INVENTOR.
NILS MILLER
BY Leech + Radue
ATTORNEYS

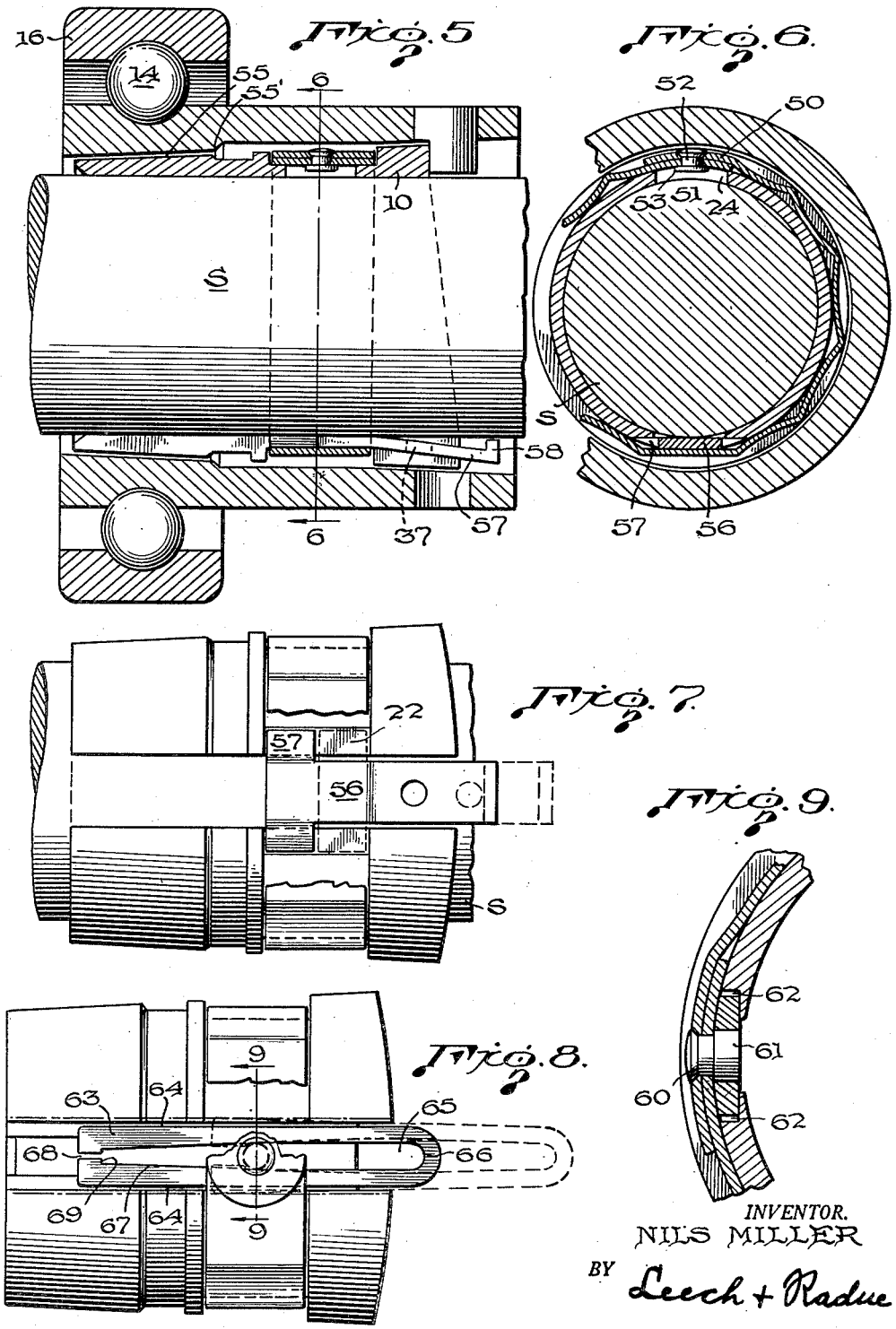

Sept. 28, 1954
N. MILLER
2,690,346
DEVICE FOR SECURING BEARING PARTS TO SHAFTS
Filed Jan. 16, 1950
3 Sheets-Sheet 3
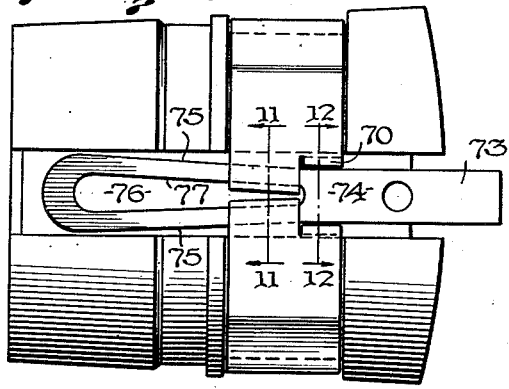
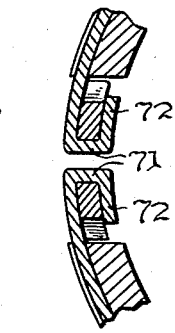
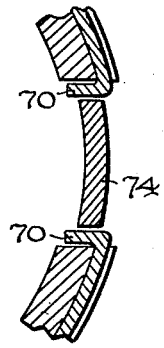
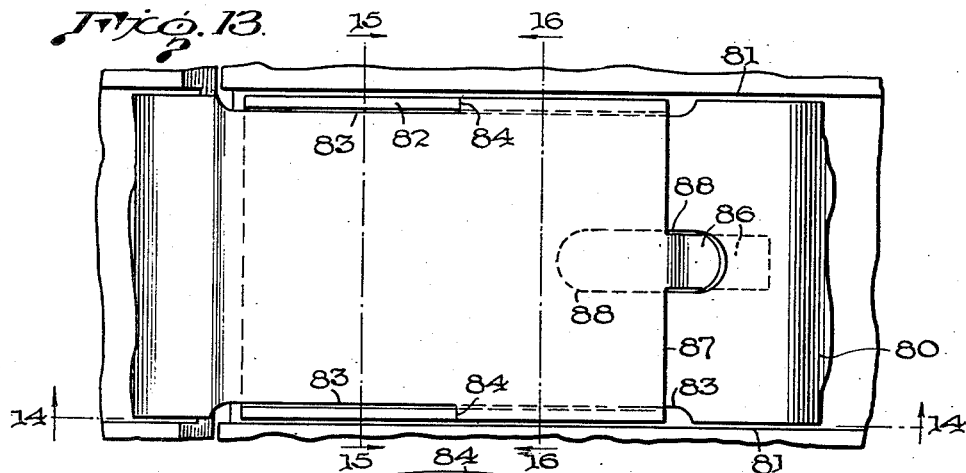
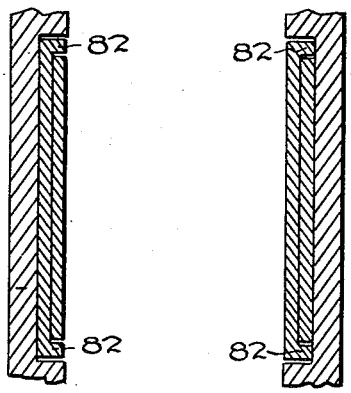
INVENTOR.
NILS MILLER
BY
Leech + Radue
ATTORNEYS

Patented Sept. 28, 1954

2,690,346

UNITED STATES PATENT OFFICE 2,690,346

DEVICE FOR SECURING BEARING PARTS TO SHAFTS

Nils Miller, Lakeland, Fla.

Application January 16, 1950, Serial No. 138,921

15 Claims. (Cl. 287—52.09)

This invention relates to machine part mountings and more particularly to devices for mounting and securing bearing and like parts to rotatable shafts in a manner to prevent relative axial or rotary movement after initial adjustment.

The present invention constitutes improvements on devices already known and used for the purpose wherein a longitudinally split sleeve bored to fit the shaft has a conical outer surface for cooperation with a mating interior surface on a bearing or other part to be mounted which clamps the sleeve onto its shaft upon relative longitudinal movement of the parts. Such movement is preferably effected by relative rotation of the parts whereby locking is automatically maintained during use.

It is a general object of the present invention to provide novel and improved devices of the type described.

More particularly it is an object of this invention to provide in a split sleeve of the type described a constriction device adapted to bind it tightly to the shaft before clamping by the cooperating outer part whereby it may be accurately positioned on the shaft and not displaced during assembly of the mating part.

An important object of the invention comprises the construction and arrangement of the constrictor device to exert maximum clamping action with minimum assembly effort.

Another important object of the invention consists in the provision of a housed slide which may be withdrawn to aid in positioning the sleeve element on its shaft.

A further important object of the invention consists in the combination of a constrictor band for the split sleeve together with a slide for camming or wedging the edges of the split apart to facilitate the assembling of the sleeve on a shaft or other machine part.

A still further important object of the invention resides in the provision of unique fastening means for the ends of the resilient constrictor bands.

One of the features of the invention resides in forming the constrictor band of corrugated resilient metal and of attaching its ends together to form a closed loop.

Another feature of the invention resides in the cooperation of the band-end to act as a securing means with the camming slide to spread the latter for opening the gap in the split sleeve.

Other and further objects and features of the invention will be more apparent upon a consideration of the accompanying drawings and following specification wherein are disclosed several exemplary embodiments of the invention, with the understanding that they may be combined, modified and changed within the scope of the appended claims without departing from the spirit of the invention.

In said drawings:

Fig. 1 is a central longitudinal section through a device for securing a bearing part to a shaft, showing the preferred form of the invention in its released condition;

Fig. 2 is a transverse section taken on line 2—2 of Fig. 1;

Fig. 3 is an elevation of the cone or sleeve of Fig. 1 shown with its releasing slide in the inactive position and with the constrictor band broken away to show details beneath it;

Fig. 4 is a fragmentary elevation taken from a position 180° removed from that of Fig. 3;

Fig. 5 is a view similar to Fig. 1 but showing a second embodiment;

Fig. 6 is a transverse section on line 6—6 of Fig. 5;

Fig. 7 is a view similar to Fig. 3 but showing the second embodiment;

Fig. 8 is a view similar to Fig. 3 but showing a third embodiment, the releasing slide being also shown in dotted lines in release position;

Fig. 9 is a fragmentary section taken on line 9—9 of Fig. 8;

Fig. 10 is a view similar to Fig. 3 but showing a fourth embodiment;

Fig. 11 is a fragmentary transverse section taken on line 11—11 of Fig. 10 looking in the direction of the arrows;

Fig. 12 is a fragmentary transverse section taken on line 12—12 of Fig. 10 looking in the opposite direction as indicated by the arrows;

Fig. 13 is a fragmentary elevation on an enlarged scale of the joining portions of a constrictor band showing a modification;

Fig. 14 is a transverse section, in fragment, of a sleeve and constrictor band taken on line 14—14 of Fig. 13;

Fig. 15 is a cross-section of the band joining taken on line 15—15 of Fig. 14; and Fig. 16 is a view similar to Fig. 15 but looking in the opposite direction and taken on line 16—16 of Fig. 14.

In my prior patent, 2,228,282, issued January 14, 1941, for Self Securing Tapered Mount, there is disclosed a number of means for mounting such machine parts as bearings or the like, onto such rotatable elements as arbors, shafts and similar parts. As in the patent, the present case depicts the invention as applied to the attachment of the inner race or shell of a ball bearing unit to a rotatable shaft, but this specific showing is in no sense limiting for the invention is applicable in many other forms. In the patent the ball bearing race is formed as a shell or sleeve having the bore internally tapered for at least a portion of its length. The means for attaching the same to a shaft comprises a conical sleeve, bored to provide a close fit on the shaft, split longitudinally for its full length to permit constriction for clamping to the shaft, and having an external taper complemental to that in the bearing part. Means is provided for effecting relative longitudinal movement between the split sleeve and the bearing shell for clamping the sleeve tightly to the shaft. In the patent Figs. 19 and 20 show the split sleeve provided at its larger end with a surface whose general plane is slightly inclined to the normal to the shaft axis. This provides two oppositely directed helical surfaces of approximately 180° arcuate extent each for cooperation with a key which projects inwardly from the tapered wall of the bearing part. Thus relative rotation of the sleeve and shell produces relative longitudinal movement serving to lock the split sleeve tightly to the shaft and the shell to the sleeve and maintain them in this condition due to the drag of the bearing in use.

The present invention deals principally with improvements in the split sleeve including constrictor band means, to give it a tighter initial fit on the shaft to prevent displacement during the bearing-shell rotating operation, as well as means for expanding the sleeve to simplify its introduction on to the shaft or its adjustment thereon and removal therefrom when desired.

Referring now to the drawing, and particularly to the preferred embodiment illustrated in Figs. 1 to 4 inclusive, a rotatable cylindrical shaft S is shown. The parts forming the major portion of the present device comprises the adapter or split sleeve 10 and the shell or bearing inner race 12. This is illustrated as being provided with a raceway 13 containing balls 14 cooperating with the raceway in outer race 16, which may mount any desired rotating part. Obviously the outer race need not be at the end of the inner race, as shown, but may be positioned intermediate the ends. The parts are so sized that when assembled and tightened on the shaft the shell 12 substantially completely houses the split sleeve 10. In Fig. 1 the parts are shown before tightening.

The adapter sleeve 10 is essentially a conical member having an internal cylindrical bore 17 substantially the same in diameter as that of the shaft whereby a tight fit may be had thereon. The outer surface of the sleeve has a small angle taper 18. Intermediate the ends the sleeve is circumferentially grooved to form a channel 20, the bottom wall of which is preferably cylindrical and the side walls substantially radial. The sleeve is split longitudinally from end to end by a wide gap 21, seen at the lower side in Fig. 1 and in plan to Fig. 3. Conveniently this gap has parallel walls. The bottom wall of the channel 20 is slabbed off at 22 spanning the gap and tangential to the bore 17. Diametrically opposite 22 a hole 24 about equal in diameter to the width of the channel passes through the bottom thereof.

To provide clearance where necessary the inner wall 25 of the bearing shell 12, which is complemental in taper to the surface of the sleeve, is relieved throughout a longitudinal area somewhat greater than the length of the channel 20, as seen at 26. This reduces the area of frictional contact between the engaging parts to facilitate the locking operation.

In order that the sleeve may have a tight binding grip on the shaft even prior to the clamping thereof by the bearing shell and yet have a true cylindrical bore so as to engage the shaft substantially throughout its circumference, a constrictor band 28 is arranged in the groove 20 in the sleeve. This band may be made of any suitable material, but preferably is transversely corrugated steel strap of suitable temper. The strap is given longitudinal expansibility by transverse corrugation, either of sinuous form or resulting from a series of sharp bends, as shown at 29 in Fig. 2. In the present case the strap is not formed into a continuous ring, as in some subsequent embodiments, but has each of its ends formed into a lug 30, by a suitable stamping operation, so that the two of them substantially fill and tightly engage the walls of hole 24 in the sleeve opposite the gap. If the strap is properly sized as to length between these lugs it can be positioned in the channel 20 while the gap is reduced by distorting the sleeve and the lugs snapped into position. Under these conditions the constricting action of the band is in addition to the springiness of the split sleeve and may be relied on to hold the sleeve tightly to the shaft so that the action of rotating the bearing shell thereon will not move it either longitudinally or circumferentially.

The constrictor band would make it difficult to position the sleeve on the shaft and adjust it longitudinally thereon to desired position were it not for the expander slide 31 capable of opening the gap beyond normal. As seen in Fig. 3, this slide comprises a sheet metal stamping having a wedge-like inner end whose tapered edges 32 converge from a width greater than that of gap 21 to a width less than the gap at 33. This portion of the slide rests on the slabbed off surface 22 while the less tapered remaining portion 34 is bent somewhat outwardly, as seen in Fig. 1, and has its end turned under as at 35. Near the outer end the edge notches 36 provide means for grasping and withdrawing the slide by means of a suitable tool. In addition movement may be imparted to the slide by engaging a rod or hook in the hole 37 therein, which lies beneath the radial opening 39 in the bearing shell in the initial position of the parts. The relative positions of hole 37 and the inner edge of hole 39 are such that a lever action may be effected for moving the slide toward the right and expanding the sleeve against the action of the constrictor band. The wedging action takes place at the corners 40 formed by the walls of the gap and the right hand wall of the band channel. The slide is prevented from being withdrawn completely by the lugs 41 on its inner end which engage the wall of the channel to limit movement.

With the arrangement just described the releasing slide is held assembled with the sleeve since its inner end bears on the slabbed area 22 and passes beneath the constrictor band and is thereby prevented from moving inwardly or outwardly radially of the sleeve.

As earlier mentioned the larger end of sleeve 10 is inclined to the normal of the shaft axis, as seen at 42, for cooperation with the key 43 secured in a suitable hole in the bearing shell opposite hole 39. This key projects inwardly not quite to the surface of the shaft and its working face is flattened to provide a larger surface against 42. The key is positioned after the shell has been loosely assembled over the split sleeve and it serves to hold the assembly into a unit for ease of handling and shipment.

The unit is ready for use as soon as the wedging slide is withdrawn, increasing the width of the gap in the sleeve so that the latter can be easily positioned over the shaft and moved longitudinally to its desired initial position. The slide is now pressed inwardly to assume the position shown in Figs. 1 and 3 and releases the sleeve so that the constrictor band draws it down tightly onto the shaft, holding it almost as an integral unit therewith in the desired initial adjusted position. With a suitable wrench or the like engaged in the opening 39, the bearing shell is rotated in a direction opposite to that which the shaft will rotate and the key 43 rides up on the incline 42 causing relative longitudinal movement between the inner and outer tapered surfaces augmenting the tightening action of the constrictor band so that the sleeve is prevented from the possibility of movement on the shaft and the whole assembly is locked together. The parts can be moved from the shaft by reversing the procedure.

In Figs. 5, 6 and 7 is illustrated a modification of the invention. Here the principal parts are identical with those in the embodiment just described and need no further description. The constrictor band, however, is here formed into a complete circle by having the ends 50 and 51 overlapping and secured together by a rivet 52, the inner head 53 of which is accommodated in the hole 24 in the split sleeve. Under these conditions the radial thickness of the constrictor band need never be greater than twice the thickness of the material forming the same, although accommodation must be made for the rivet head as shown. As seen in Fig. 5 the cooperating tapered surfaces at 55 are somewhat shorter longitudinally than in the first embodiment, effected by a second channel to the left of the one receiving the band. This serves to further reduce the relative friction between the parts and also prevents the corner 55 of the hardened race from cutting into the softer metal of the sleeve.

In the arrangement shown particularly in Fig 7 the wedging or camming slide has been supplanted by a slide 56 the main portion of which has straight parallel sides and the inner end of which has T-head 57 riding over slabbed off portion 22 at the bottom of the constrictor band channel. The head limits the amount of outward movement of the slide, which in this case does not release the constrictor band or expand the split sleeve but merely provides a convenient "pull out" which can be grasped by a tool such as pliers for use in longitudinally moving the sleeve on the shaft prior to the final clamping action. In this case the outer portion of the slide is bent away from the shaft surface where it fits between the walls of the gap, as shown at 57, and its outer end 58 is inturned to engage the surface of the shaft. The small hole 37 is provided as in the first form for use in initially moving the slide so that its end may be grasped by pliers or a suitable hook passed beneath the part 58.

In Figs. 8 and 9 a further embodiment of wedging slide is illustrated for use with a band having overlapping ends secured together by rivet 60 having its inner head enlarged to a cylindrical button 61 projecting well into the gap. The hole opposite the gap can be omitted. The gap in this case is wider on the outer surface of the split sleeve than on the inner surface, providing a ledge or shell 62 at each side on which the parallel sided slide 63 is accommodated between the main gap walls and prevented from falling into the central bore of the sleeve before assembly on the shaft. The slide is held in position by the overlapping constrictor band as in previous embodiments. The slide side walls 64 are somewhat less in spacing than the walls of the gap. Throughout the rest of its length the slide is provided with a longitudinal central cutout 65 from its closed outer end 66. From 66 to the middle of the length this has parallel walls spaced about the diameter of the rivet button 61 and receiving it. The walls of the remainder of the cutout converge as at 67. They are offset as at 68 to provide stop shoulders 69 while permitting the inner end full freedom to expand. If a suitably hooked tool is engaged at 66 the slide may be withdrawn. As this happens the tapered walls 67 are spread apart by engagement with the button 61 and the side walls 64 engage the walls of the gap and spread the latter to the position shown in dotted lines in Fig. 8, when the slide is in the dotted position shown, where it is limited from further movement by the stops 69 engaging the button. The operation of this is the same as in the other embodiments in the assembly of the parts on to the shaft.

In Figs. 10, 11 and 12 a novel cooperation of the constrictor band and the wedging slide is illustrated. Under these conditions the band may be a continuous, flat one before being formed into a ring, since its constricting action may come solely from the wedging slide rather than from its natural resilience. The ends of the band are each split longitudinally for a short distance and one pair of tangs or tabs thereon is shortened and bent inwardly as at 70 to engage the walls of the gap, as best seen in Fig. 12, while the other and longer pair are bent in at right angles, as seen at 71, and then circumferentially back upon themselves as at 72, leaving between the main and final portions of the tabs a space just thick enough to accommodate the wedging slide 73. As in former embodiments this is formed from a piece of metal having the plane parallel sided outer portion 74 of a width such that it just readily fits between the tabs 70, as Fig. 12, when it is in its housed position. From this portion toward its closed left end the edge walls 75 taper outwardly to substantially the full width of the gap. An opening 76 is punched out of this tapered end to provide side walls 77 parallel to the tapered walls 75 and these are the walls engaged by the turned in portions 71 of the band.

Considering now the operation of this embodiment, if the slide is moved toward the right, as seen in Fig. 10, the walls 77 move away from the tabs 71 while the walls 75 spread apart the tabs 70 and with them push the walls of the gap apart to facilitate the assembly of the split sleeve on the shaft. As the slide is pressed inwardly the sleeve is permitted to close on the shaft, since the walls 75 are moved out from between the spread tabs 70 and the walls 77 draw in on the tabs 71 of the band and constrict it to tighten the band to the sleeve.

Figs. 13 to 16, inclusive, illustrate a further form of band end attachment which permits securing together the ends of a band or strap of any type for any use without increasing the thickness of the joint to more than double that of the material of the band. The band shown at 80 is of the corrugated type and arranged in the groove of a split sleeve which has the parallel walls 81. The ends of the band are not corrugated and except for facing in opposite directions are identical in that each is provided adjacent its end with a pair of side wings 82 turned down at right angles to the major plane of the band and extending beyond its face exactly the thickness of the band. The longitudinal extent of this flanging may be as shown in Fig. 13 or of lesser extent depending on the strength required. The overall width across these flanges is the same as that of the band. To accommodate these flanges each band end just inwardly of its flanges is narrowed as at 83 by an amount to just receive the flanges on the opposite end when the two are overlapped and interlocked as shown, with one set of flanges facing outwardly as in Fig. 15 and the other facing inwardly as in Fig. 16. Interlocking at the positions 84 prevents any relative circumferential movement of the ends. Radial movement, which might serve to unlock the overlapped ends, is prevented by means of a tongue 86 projecting beyond the end 87 of the upper part and passing down through a cutout 88 in the under part which is elevated at 89 to permit the tongue 86 to pass beneath it and bear on the bottom wall of the band channel. The cutout 88 extends far to the left, as seen in Fig. 13, to facilitate the assembly.

Obviously other forms of constrictor band and camming or wedging slides are possible.

The bands may be made of any suitable material and in addition to obtaining resilience as shown may be of the "expanded metal" type, may be of the "garter" spring type as used on fluid seals and need not be even of metal. They can have their ends joined by any of the devices shown herein or by welding, etc.

The whole assembly of parts forming the device of the present invention results in an extremely simple and effective means for mounting machine parts on rotating elements at a minimum of cost and effort.

I claim:

1. In an assembly of the type described, in combination, a one piece conical sleeve bored to fit closely over a shaft, said sleeve having a single, full length, longitudinal gap therein of substantial width under all conditions, a machine component having a portion of greater length than the sleeve and having a conical bore complemental to the conical surface of said sleeve, and adapted to compress the latter into a gripping fit on the shaft upon relative longitudinal movement over the sleeve, coacting parts on the sleeve and component for effecting such longitudinal movement upon partial relative rotation of the sleeve and component in either direction, a wide circumferential groove in the conical surface of said sleeve intermediate its ends and having a cylindrical bottom, a resilient constriction band tensioned circumferentially in said groove to tighten the sleeve on a shaft, and means accessible when the machine component is in position to widen said gap and loosen the sleeve on the shaft for longitudinal adjustment.

2. The assembly as defined in claim 1 in which said band comprises a metal strap corrugated transversely of said groove.

3. The assembly as defined in claim 2 in which the strap has ends substantially abutting and secured to the sleeve remote from said gap.

4. The assembly as defined in claim 3 in which the securing is effected between the walls of a hole in the sleeve and lugs formed on the ends of the band.

5. The assembly as defined in claim 1 in which said means constitutes a longitudinal movable slide in said gap and beneath said component and extending beneath said band, cooperating means on the sleeve and slide to facilitate adjustment of the sleeve longitudinally of the shaft when released by the machine component, and means providing access to the slide when housed to extend the same beyond an end of the component for use.

6. In an assembly of the type described, in combination, a conical sleeve bored closely to fit a predetermined shaft, said sleeve having a full-length longitudinal gap therein, a bearing race member having a bore to fit said sleeve and compress the latter into a grip fit on the shaft upon relative longitudinal movement over the sleeve, a circumferential groove in the conical surface of said sleeve intermediate its ends, a resilient constrictor band in said groove circumferentially tensioned to tighten the sleeve on a shaft, said gap being widened beneath said groove, a slide in the widened portion and one end of said gap and having an end normally projecting beyond the end of the sleeve, the opposite end of the slide being wedgelike to engage the gap walls beyond the groove when withdrawn and expand the gap to loosen the sleeve on its shaft.

7. The device claimed in claim 6 in which the slide in its housed position is entirely within said member, an opening in said member adapted to be positioned above said slide and an operating surface on said slide for engagement by a tool extending through said opening.

8. A bearing mounting assembly comprising in combination a longitudinally split cone bored to fit a shaft, an internally coned bearing race sized to move over the cone to clamp the latter to the shaft, means to effect relative movement of the cone and race, a circumferentially resilient constrictor band tensioned on said cone to give it an initial grip on the shaft, a slide movable longitudinally in the split of the cone and cooperating wedging surfaces on the cone and slide engaging to open the split as the slide is moved outwardly from its housed position in the cone.

9. A bearing mounting assembly comprising in combination a longitudinally split cone bored to fit a shaft, an internally coned bearing race sized to move over the cone to clamp the latter to the shaft, means to effect relative movement of the cone and race comprising a double ramp surface on the larger end of the cone with the low point opposite said split and a cooperating shoe projecting into the bore of the race and cooperating with said surface as the parts are relatively rotated, a resilient constrictor band circumferentially tensioned on said cone to give it an initial grip on the shaft, said split having widely spaced parallel walls, said band having its ends overlapped at said split, a rivet securing said ends together and having a portion extending into said split, a slide closely fitting the walls of said split and having a longitudinally tapered slot therein receiving said rivet portion.

and means to move said slide longitudinally outwardly of said split whereby it is expanded by the rivet to spread the split and loosen the cone on its shaft.

10. A bearing mounting assembly comprising in combination a longitudinally split cone bored to fit a shaft, an internally coned bearing race sized to move over the cone to clamp the latter to the shaft, means to effect relative movement of the cone and race, a resilient constrictor band on said cone to give it an initial grip on the shaft, said band having each end turned into said split in two circumferentially spaced lugs, a slide movable longitudinally in said split and having flared edges engaging between the wider spaced lugs on the band ends to spread them as the slide is withdrawn and a channel in said slide having walls parallel to said edges and engaged by the remaining lugs to tighten the band as the slide is pushed into the split.

11. The device defined in claim 10 in which the last mentioned lugs have ends passing beneath the slide to hold it in position when the cone is removed from its shaft.

12. The assembly as defined in claim 1 in which the resilient constriction band is transversely corrugated and of thin metal, the ends of said band being smooth and overlapping and each being narrowed throughout the inner half of the smooth end, the outer half of each such end having side flanges at right angles to the surface of the band and projecting into the spaces on the other half provided by said narrowings, the flanges interlocking to hold the band tight to constrict the conical sleeve onto its shaft.

13. The device as defined in claim 12 in which the overlapped end has a longitudinally extending tongue and a slot in the portion of the band adjacent the other end adapted to receive the tongue to prevent unlapping of said ends.

14. The device as defined in claim 13 in which the portion of the band containing the slot is offset radially outwardly a distance equal to the thickness of the band whereby the connection of the band ends is only twice the thickness of the band.

15. Means for mounting a machine part on a rotatable cylindrical element comprising a contractile member bored to fit said element and having a conical outer surface, said machine part having a complementary tapered bore, means to effect relative longitudinal movement of the part and member upon relative rotation thereof to clamp the member onto the element, auxiliary means surrounding the member to cause it to grip the element and means carried by said member and movable relative thereto to expand the latter against the action of said auxiliary means.

References Cited in the file of this patent

UNITED STATES PATENTS

| Number | Name | Date |
|---|---|---|
| 306,332 | Garver | Oct. 7, 1884 |
| 385,798 | Firth | July 10, 1888 |
| 687,864 | Smyth | Dec. 3, 1901 |
| 1,340,102 | Ayres | May 11, 1920 |
| 1,758,515 | Heiermann | May 13, 1930 |
| 2,228,282 | Miller | Jan. 14, 1941 |
| 2,322,832 | Davis | June 29, 1943 |